(12) United States Patent
Patel et al.

(10) Patent No.: US 7,509,809 B2
(45) Date of Patent: Mar. 31, 2009

(54) GAS TURBINE ENGINE COMBUSTOR WITH IMPROVED COOLING

(75) Inventors: Bhawan Patel, Mississauga (CA); Russell Parker, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 662 days.

(21) Appl. No.: 11/149,264

(22) Filed: Jun. 10, 2005

(65) Prior Publication Data

US 2006/0277921 A1 Dec. 14, 2006

(51) Int. Cl.
F02C 1/00 (2006.01)
F02G 3/00 (2006.01)

(52) U.S. Cl. .............................. 60/754; 60/804; 60/760

(58) Field of Classification Search ........... 60/752–760, 60/804
See application file for complete search history.

(56) References Cited

U.S. PATENT DOCUMENTS

| | | | |
|---|---|---|---|
| 2,669,090 A | 2/1954 | Jackson | |
| 3,169,367 A | 2/1965 | Hussey | |
| 3,440,818 A * | 4/1969 | Caruel et al. | 60/726 |
| 3,608,309 A | 9/1971 | Hill et al. | |
| 3,706,203 A * | 12/1972 | Goldberg et al. | 60/757 |
| 4,162,611 A * | 7/1979 | Caruel et al. | 60/748 |
| 4,226,088 A | 10/1980 | Tsukahara et al. | |
| 4,246,757 A | 1/1981 | Heberling | |
| 4,475,344 A | 10/1984 | Mumford et al. | |
| 4,590,769 A | 5/1986 | Lohmann et al. | |
| 4,702,073 A | 10/1987 | Melconian | |
| 5,165,226 A | 11/1992 | Newton et al. | |
| 5,237,813 A * | 8/1993 | Harris et al. | 60/804 |
| 5,307,637 A | 5/1994 | Stickles | |
| 5,351,475 A * | 10/1994 | Ansart et al. | 60/804 |
| 5,398,509 A | 3/1995 | North et al. | |
| 5,590,531 A | 1/1997 | Desaulty et al. | |
| 6,205,789 B1 * | 3/2001 | Patterson et al. | 60/754 |
| 6,260,359 B1 * | 7/2001 | Monty et al. | 60/752 |
| 6,266,961 B1 * | 7/2001 | Howell et al. | 60/752 |
| 6,286,300 B1 * | 9/2001 | Zelina et al. | 60/804 |
| 6,408,629 B1 * | 6/2002 | Harris et al. | 60/804 |
| 6,427,446 B1 * | 8/2002 | Kraft et al. | 60/737 |
| 6,434,821 B1 * | 8/2002 | Nelson et al. | 29/888.01 |
| 6,449,952 B1 * | 9/2002 | Emilianowicz et al. | 60/772 |
| 6,474,070 B1 * | 11/2002 | Danis et al. | 60/739 |
| 6,513,331 B1 * | 2/2003 | Brown et al. | 60/754 |
| 6,557,349 B1 * | 5/2003 | Young et al. | 60/752 |
| 6,655,146 B2 * | 12/2003 | Kutter et al. | 60/752 |
| 6,655,149 B2 * | 12/2003 | Farmer et al. | 60/754 |
| 6,832,482 B2 * | 12/2004 | Martling et al. | 60/737 |
| 6,868,675 B1 * | 3/2005 | Kuhn et al. | 60/772 |
| 7,086,232 B2 * | 8/2006 | Moertle et al. | 60/752 |
| 7,093,439 B2 * | 8/2006 | Pacheco-Tougas et al. | 60/752 |
| 7,216,485 B2 * | 5/2007 | Caldwell et al. | 60/772 |
| 7,237,389 B2 * | 7/2007 | Ryan et al. | 60/800 |
| 7,260,936 B2 * | 8/2007 | Patel et al. | 60/752 |
| 2008/0010991 A1 * | 1/2008 | Johnson et al. | 60/772 |

* cited by examiner

*Primary Examiner*—William H Rodriguez
(74) *Attorney, Agent, or Firm*—Ogilvy Renault LLP

(57) ABSTRACT

A gas turbine engine combustor liner having a plurality of holes defined therein for directing air into the combustion chamber. The plurality of holes provide a greater cooling air flow in fuel nozzle regions than in other areas of the combustor liner.

18 Claims, 4 Drawing Sheets

GAS TURBINE ENGINE COMBUSTOR WITH IMPROVED COOLING

TECHNICAL FIELD

The invention relates generally to a combustor of a gas turbine engine and, more particularly, to a combustor having improved cooling.

BACKGROUND OF THE ART

Cooling of combustor walls is typically achieved by directing cooling air through holes in the combustor wall to provide effusion and/or film cooling. These holes may be provided as effusion cooling holes formed directly through a sheet metal liner of the combustor walls. Opportunities for improvement are continuously sought, however, to provide improve cooling, better mixing of the cooling air, better fuel efficiency and improved performance, all while reducing costs.

Further, a new generation of very small turbofan gas turbine engines is emerging (i.e. a fan diameter of 20 inches or less, with about 2500 lbs. thrust or less), however known cooling designs have proved inadequate for cooling such relatively small combustors as larger combustor designs cannot simply be scaled-down, since many physical parameters do not scale linearly, or at all, with size (droplet size, drag coefficients, manufacturing tolerances, etc.).

Accordingly, there is a continuing need for improvements in gas turbine engine combustor design.

SUMMARY OF THE INVENTION

It is therefore an object of this invention to provide a gas turbine engine combustor having improved cooling.

In one aspect, the present invention provides a gas turbine engine combustor comprising a liner enclosing a combustion chamber, the liner including a dome portion at an upstream end thereof and at least one annular liner wall extending downstream from and circumscribing said dome portion, the dome portion having defined therein a plurality of openings each adapted to receive a fuel nozzle, said liner wall having a plurality of holes defined therein to form an annular cooling band extending around said liner wall immediately downstream of said dome portion for directing cooling air into the combustion chamber, said plurality of holes within said annular cooling band including a first set of cooling holes disposed within circumferentially spaced regions aligned with said openings and located downstream therefrom and a second set of cooling holes disposed outside said regions, wherein said regions having said first set of cooling holes provide a greater cooling air flow therethrough than similarly sized areas of said combustor liner having said second set of cooling holes therein.

In another aspect, the present invention provides a gas turbine engine combustor comprising an annular liner enclosing a combustion chamber, the liner having defined therein a plurality of openings each adapted to receive a fuel nozzle for directing fuel into the combustion chamber in a spray cone, the liner having means for directing cooling air into the combustion chamber, said means providing more cooling air in regions corresponding substantially in shape to said spray cone and located downstream of each opening in alignment therewith.

In another aspect, the present invention provides a combustor for a gas turbine engine comprising: combustor walls including an inner liner and an outer liner spaced apart to define at least a portion of a combustion chamber therebetween; a plurality of fuel nozzles disposed at an end of the combustor between said inner and outer liners for injecting a spray cone of fuel mixture into the combustion chamber; and a plurality of cooling apertures defined through at least one of said inner and outer liners for delivering pressurized cooling air surrounding said combustor into said combustion chamber, said plurality of cooling apertures defining an annular cooling band extending around said at least one of said inner and outer liners immediately downstream from said end of the combustor having said fuel nozzles, said cooling apertures being disposed in a first spacing density in first regions of said annular cooling band proximate each of said fuel nozzles and defining a surface area corresponding substantially in shape to the spray cone of said fuel nozzles, said cooling apertures being disposed in a second spacing density in at least a second region of said annular cooling band outside said first regions, said annular cooling band having said first regions circumferentially spaced throughout and said second regions disposed between each of said first regions, and wherein said first spacing density is greater than said second spacing density.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
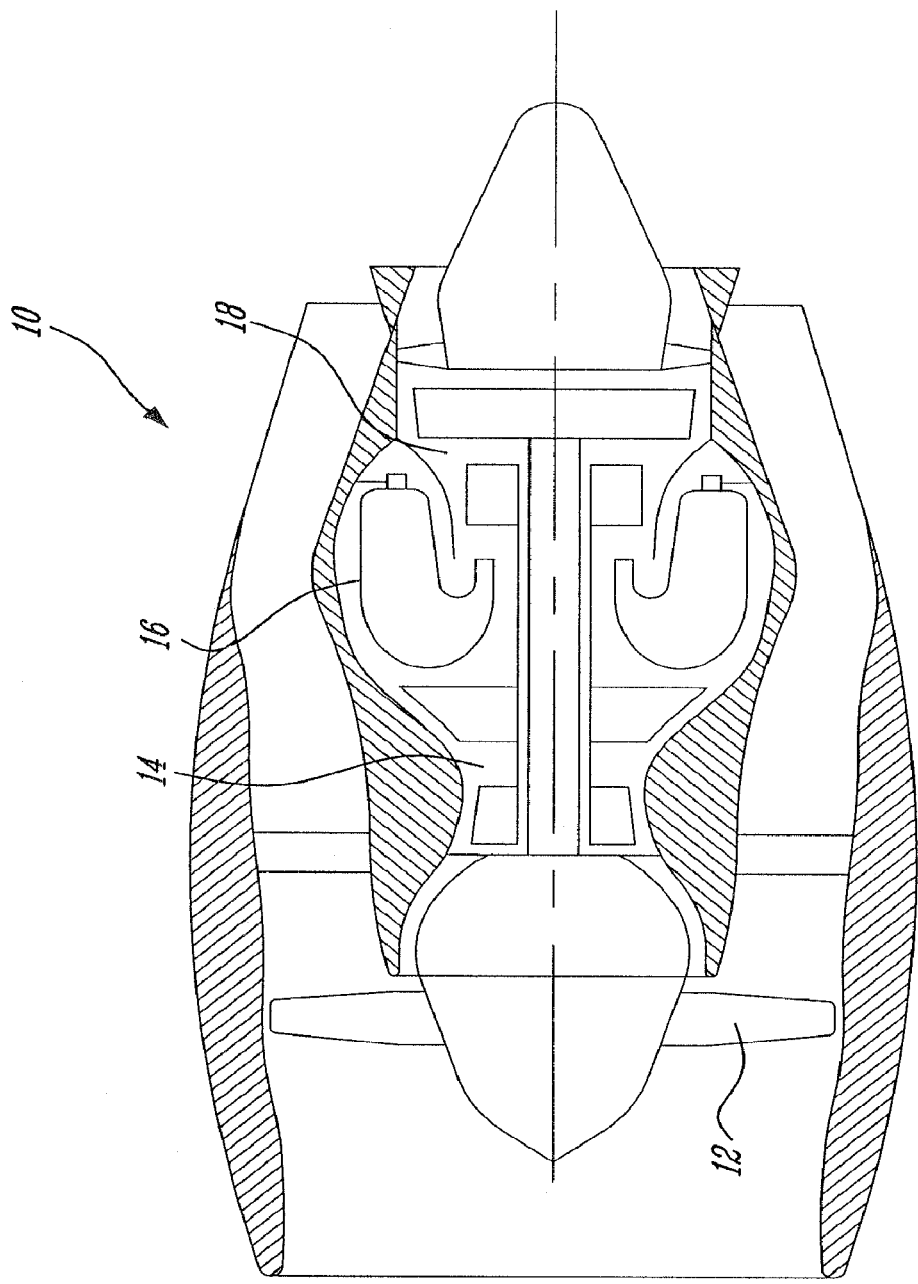
FIG. 1 is a schematic partial cross-section of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
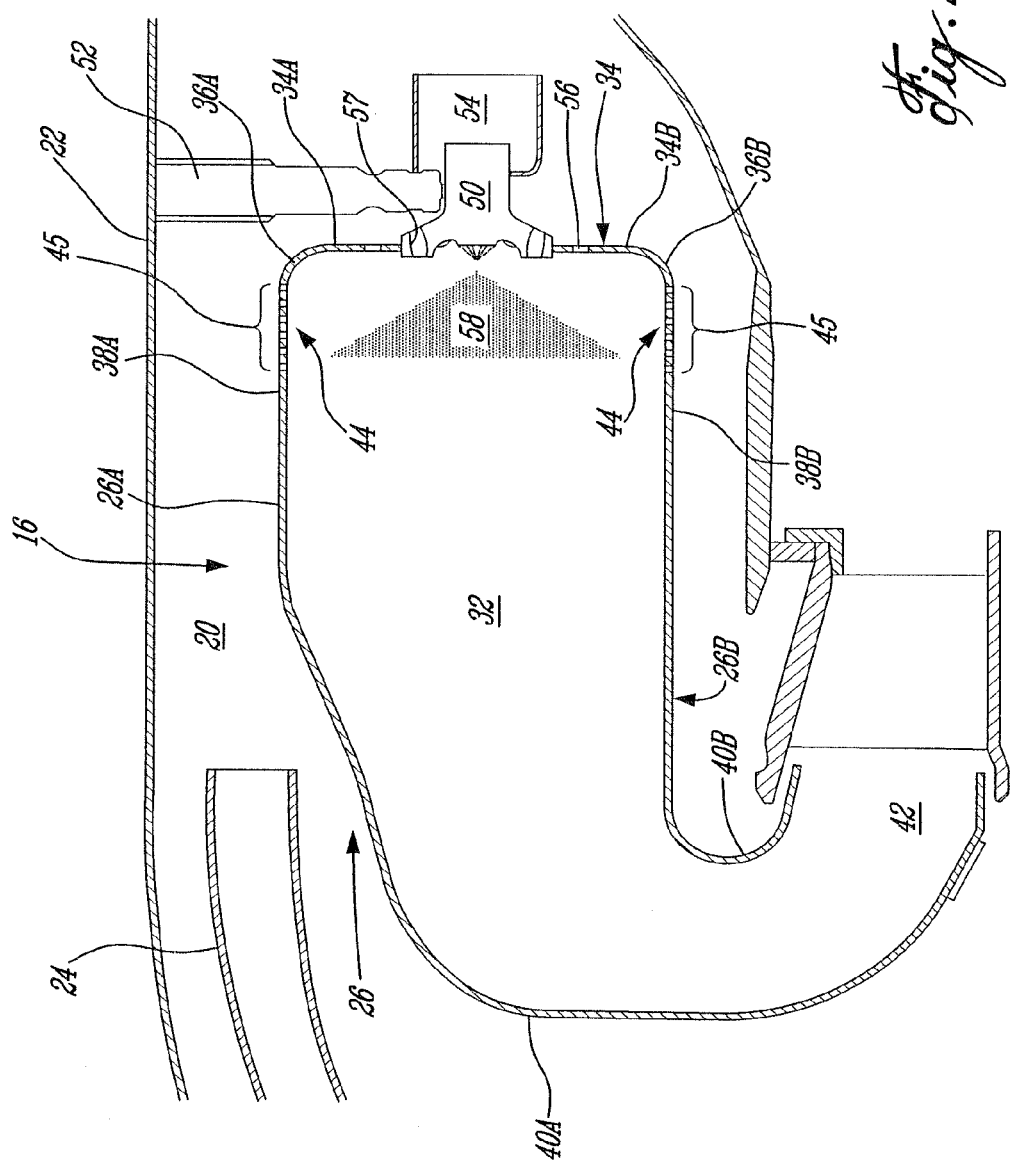
FIG. 2 is partial cross-section of a reverse flow annular combustor having cooling holes at an upstream end thereof in accordance with one aspect of the present invention.

Referring to FIG. 2, the combustor 16 is housed in a plenum 20 defined partially by a gas generator case 22 and supplied with compressed air from compressor 14 by a diffuser 24. The combustor 16 is preferably, but not necessarily, an annular reverse flow combustor. Combustor 16 comprises generally a liner 26 composed of an outer liner 26A and an inner liner 26B defining a combustion chamber 32 therein. Combustor 16 preferably has a generally dome portion 34, as will be described in more detail below. Outer liner 26A includes an outer dome panel portion 34A, a relatively small radius transition portion 36A, a cylindrical wall portion 38A, long exit duct portion 40A, while inner liner 26B includes an inner dome panel portion 34B, a relatively small radius transition portion 36B, a cylindrical wall portion 38B, and a small exit duct portion 40B. The exit ducts 40A and 40B together define a combustor exit 42 for communicating with turbine section 18. The combustor liner 26 is preferably sheet metal.

A plurality of cooling holes 44 are provided in liner 26, more particularly in the upstream end of the cylindrical body panel portions 38A, 38B thereof, as will be described in further detail below.

A plurality of air-guided fuel nozzles 50, having supports 52 and supplied with fuel from internal manifold 54, communicate with the combustion chamber 32 to deliver a fuel-air mixture 58 to the chamber 32. As depicted in FIG. 2, the fuel-air mixture is delivered in a cone-shaped spray pattern, and therefore referred to in this application as fuel spray cone 58.

In use, compressed air enters plenum 20 from diffuser 24. The air circulates around combustor 16 and eventually enters combustion chamber 32 through a variety of apertures defined in the liner 26, following which some of the compressed air is mixed with fuel for combustion. Combustion gases are exhausted through the combustor exit 42 to the turbine section 18. The air flow apertures defined in the liner include the plurality of cooling holes 44 in an upstream end of the liner 26. While the combustor 16 is depicted and will be described below with particular reference to the upstream cooling holes 44, it is to be understood that compressed air from the plenum 20 also enters the combustion chamber via other apertures in the combustor liner 26, such as combustion air flow apertures, including openings 56 surrounding the fuel nozzles 50 and fuel nozzle air flow passages 57, and a plurality of other cooling apertures (not shown) which may be provided throughout the liner 26 for effusion/film cooling of the liner walls. Therefore while only the upstream cooling holes 44 are depicted, a variety of other apertures may be provided in the liner for cooling purposes and/or for injecting combustion air into the combustion chamber. While compressed air which enters the combustor, particularly through and around the fuel nozzles 50, is mixed with fuel and ignited for combustion, some air which is fed into the combustor is preferably not ignited and instead provides air flow to effusion cool the wall portions of the liner 26.

Figure 3:
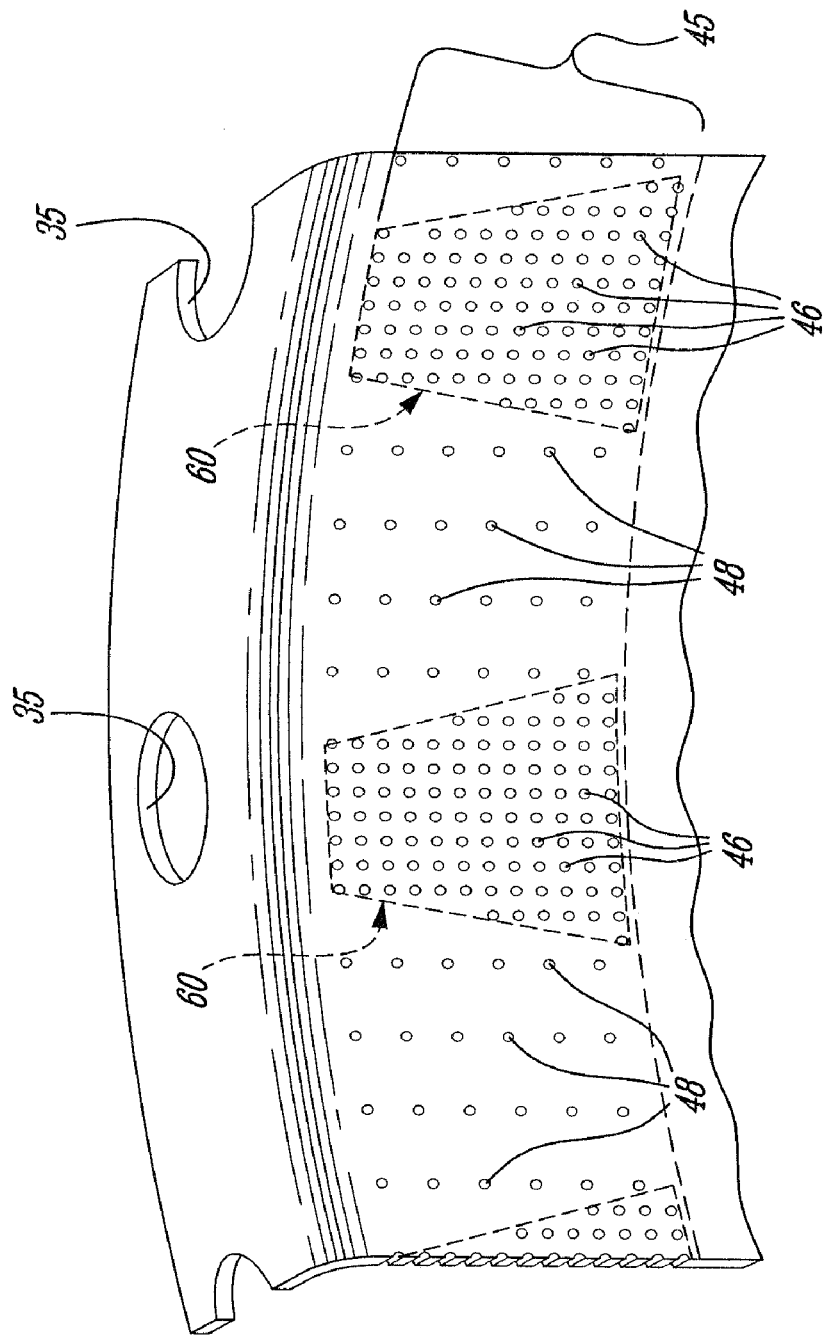
FIG. 3 is a partial perspective view of an annular wall portion of the combustor of FIG. 2 at said upstream end.

Referring to FIG. 3, as mentioned the combustor liner 26 includes a plurality of cooling air holes 44 formed in the upstream end of the cylindrical wall portions 38A, 38B, such that effusion cooling is achieved at this upstream end of the combustor 16 by directing air though the cooling holes 44. As this end of the combustor is closest to the fuel nozzles 50, and therefore to the air-fuel mixture which is ejected therefrom and ignited, sufficient cooling in this region of the combustor is particularly vital. The plurality of cooling holes 44 are preferably angled downstream, such that they direct the cooling air flowing therethrough along the inner surfaces of the cylindrical wall portions 38A, B of the combustor liner and such that the cooling air is generally prevented from being ignited. Preferably, all such cooling holes 44 are disposed at an angle of less than about 28 degrees relative to the inner surface of the cylindrical liner walls 38A, 38B.

The plurality of cooling holes 44 comprise an annular band 45 of cooling holes which extend around each of the cylindrical wall portions 38A, 38B, and which axially (relative to the engine axis) begin at an upstream end thereof near the rounded transition wall portions 36A, 36B and extend downstream a given distance. In this embodiment the transition portions 36A, B are frustoconical with relatively small radii connections to their respective dome and cylindrical wall panels, however other wall geometries may also be employed. The plurality of cooling holes 44 are comprised generally of at least two main groups, namely first cooling holes 46 and second cooling holes 48.

Figure 4:
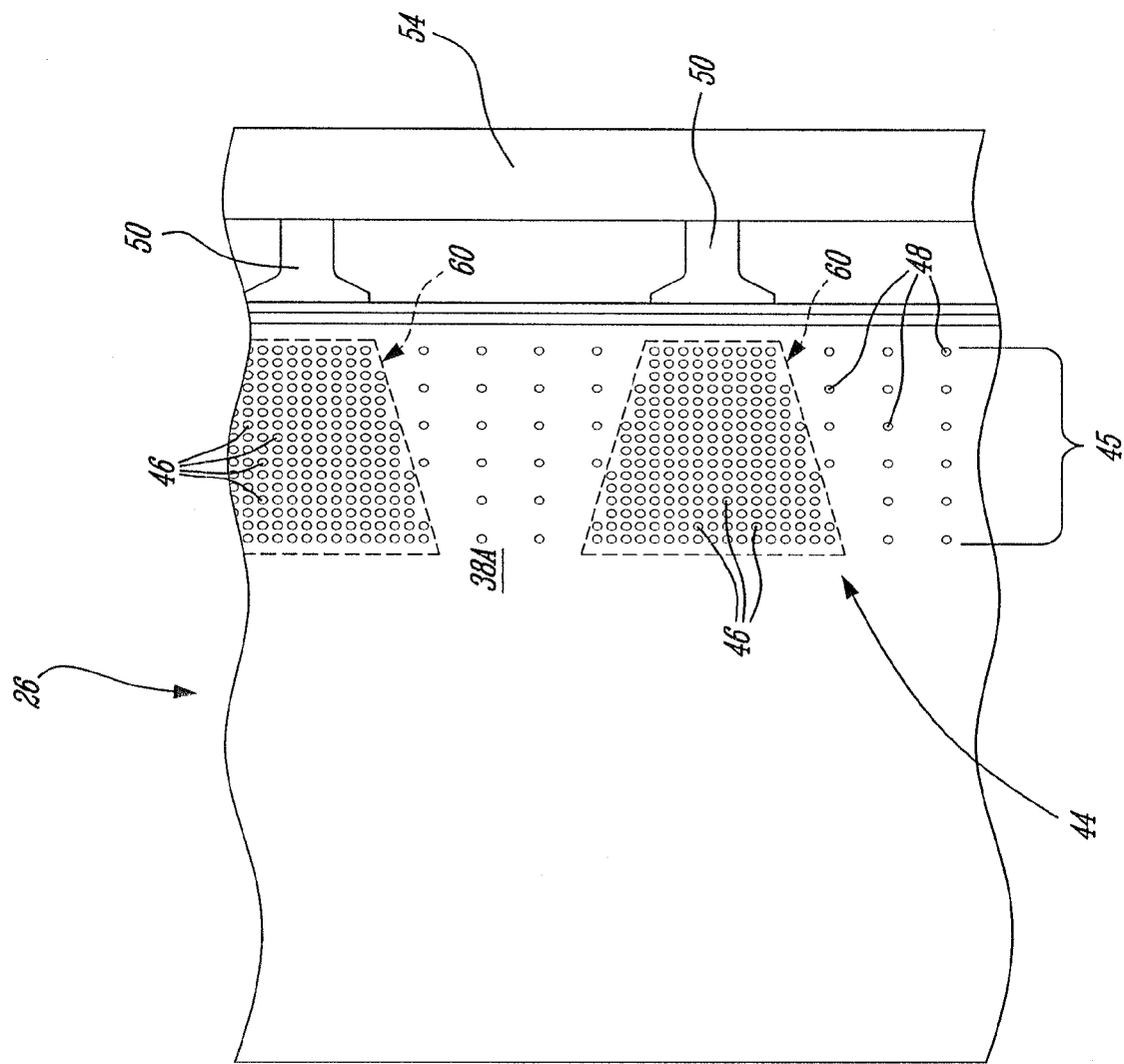
FIG. 4 is a schematic partial top elevation view of the combustor of FIG. 2.

As shown in FIGS. 3 and 4, the first and second cooling holes 46, 48 are arranged in the liner in a selected pattern such that increased cooling air is provided to regions 60 identified as being regions of local high temperature. Particularly, the regions 60 of first cooling holes 46 are aligned with each opening 45 in the dome portion 34 of the liner which receive the fuel nozzles 50 therein, and define a truncated wedge or triangular shape, wherein the cooling holes 46 fan out downstream from the rounded transition wall portions 36A, 36B. More particularly, the regions 60 define a trapezoidal perimeter in which the upstream and downstream edges are parallel, the upstream edge being shorter than the downstream edge. The regions 60 of first cooling holes 46 are thus formed to correspond to the fuel spray cone 58 ejected into the combustion chamber by the fuel nozzles 50 which, when ignited, exposes the regions 60 of the liner 26 to particularly high temperatures. While other shapes of regions 60 may be employed, these will nonetheless preferably correspond to identified regions of local high temperature of the liner walls downstream of the fuel nozzles caused by the proximity of the ignited fuel mixture ejected therefrom. Thus first cooling holes 46 are defined within the regions 60 in alignment with each fuel nozzle 50 and preferably corresponding in shape to the fuel spray cone 58, and the second cooling holes 48 are defined in the liner wall outside of these regions 60, at least between each adjacent region 60 within the annular band 45 about the upstream end of the combustor liner 26.

As noted above, greater cooling air flow is provided within regions 60 of the liner to cool these areas of the liner which are exposed to the highest temperatures. Preferably, this is accomplished by spacing the first cooling holes 46, within the regions 60, closer together than the second cooling holes 48. In other words, the first cooling holes 46 are formed in the liner at a higher spacing density relative to the spacing density of the second cooling holes 48. Thus, in the preferred embodiment, the diameters of the first cooling holes 46 and the second cooling holes 48 are substantially the same, however more first cooling holes 46 are disposed in a given area of liner wall within the regions 60 than second cooling holes 48 in a similarly sized area of the liner wall outside the regions 60. However, it is to be understood that other configurations can also be used to provide more cooling air flow within the identified regions of local high temperature relative to the rest of the combustor liner. For example, the spacing densities of both first and second cooling holes may be the same if the diameters of the first cooling holes 46 are larger than those of the second cooling holes 48, or both the spacing density and the diameters of the first and second cooling holes may be different.

These aspects of the invention are particularly suited for use in very small turbofan engines which have begun to emerge. Particularly, the correspondingly small combustors of these very small gas turbine engines (i.e. a fan diameter of 20 inches or less, with about 2500 lbs. thrust or less) require improved cooling, as the cooling methods used for larger combustor designs cannot simply be scaled-down, since many physical parameters do not scale linearly, or at all, with size (droplet size, drag coefficients, manufacturing tolerances, etc.). The low annular combustor height between the inner and outer liner walls 26A, 26B renders it particularly difficult to avoid fuel impingement on the inner surfaces of the liner walls 38A, 38B. This is further compounded by the flowing problems which arise with such a small combustor and further necessitate additional cooling of the liner walls. The aerodynamic obstructions caused by the nozzle stems and the fuel manifold surrounding such a small combustor can result in an uneven distribution of air flow and velocity through the fuel nozzle swirlers, thus creating a skewed spray cone. Although the skilled reader will appreciate that the size of the fuel spray cone 58 can be controlled (e.g. by using more air in the nozzle swirler or by providing a nozzle having a different size/shaped nozzle cone) such that the fuel spray cone is narrowed to avoid fuel impingement on the liner walls, excessive narrowing of the fuel spray cone 58 will require the overall combustor axial length to be increased. This is not desirable for such a small combustor in which the dimensional envelope is already limited. Further, the addition of more combustion air via the nozzle swirlers, in an attempt to control the fuel spray cone such that fuel impingement on the liner walls is limited, can create a lean fuel-air ratio which brings the flame front closer to the line walls, thereby resulting in high radiation and convection heat load on the combustor liner, and can also adversely effect flame stability. Too little combustion air, however, can result in excessive emissions of smoke and carbon monoxide from the combustor and unduly limit the lifespan of the combustor walls. Accordingly, the regions 60 of the combustor liner cylindrical walls 38A, 38B for such a small combustor 16 are provided with more localized and directed cooling than other regions of the combustor liner, which are less prone to fuel impingement from the fuel spray cone 58. This is at least partly achieved using the regions 60 of first cooling apertures 46 defined within the regions 60, which direct an optimized volume of coolant to these regions and in a direction which will not adversely effecting the combustion of the air-fuel mixture within the combustion chamber (i.e. by preventing the coolant air from being used as combustion air). By increasing the density of the holes within these regions 60, while reducing hole density in other portions of the combustor liner outside these regions, efficient cooling is maintained while nevertheless providing more cooling air to the regions 60 identified as being local high temperature regions within which fuel impingement may occur. Thus, the durability of the combustor liner within this upstream primary combustion zone is improved, without adversely affecting the flame out, flame stability, combustion efficiency and/or the emission characteristics of the combustor liner 26.

The combustor liner 26 is preferably provided in sheet metal and the plurality of cooling holes 44 are preferably drilled in the sheet metal, such as by laser drilling. However, other known combustor materials and construction methods are also possible.

The above description is meant to be exemplary only, and one skilled in the art will recognize that changes may be made to the embodiments described without department from the scope of the invention disclosed. For example, the invention may be provided in any suitable annular or "cannular" combustor configuration, either reverse flow as depicted or alternately a straight flow combustor, and is not limited to application in turbofan engines. Although the use of holes for directing air is preferred, other means such as slits, louvers, etc. may be used in place of or in addition to holes. In annular combustors, first and second holes may be provided on one side of the dome only (e.g. annular outside), but not the other (i.e. annular inside), or vice versa. Still other modifications which fall within the scope of the present invention will be apparent to those skilled in the art, in light of a review of this disclosure, and such modifications are intended to fall within the literal scope of the appended claims.

The invention claimed is:

1. A gas turbine engine reverse-flow combustor comprising a liner enclosing a combustion chamber, the liner including a dome portion at an upstream end thereof and two annular liner walls extending downstream from and circumscribing said dome portion, the two annular liner walls being spaced apart such that the dome circumscribed thereby and disposed there between is annular, the dome portion having defined therein a plurality of openings each adapted to receive a fuel nozzle, the openings defined in said dome being positioned substantially equidistant between the two annular liner walls, at least one of said liner walls having a plurality of holes defined therein to form an annular cooling band extending around said liner wall immediately downstream of said dome portion for directing cooling air into the combustion chamber, said plurality of holes within said annular cooling band including a first set of cooling holes disposed within circumferentially spaced regions aligned with said openings and located downstream therefrom and a second set of cooling holes disposed outside said regions, wherein said regions having said first set of cooling holes provide a greater cooling air flow there through than similarly sized areas of said combustor liner having said second set of cooling holes therein.

2. The combustor as defined in claim 1, wherein said regions substantially correspond in shape to a fuel spray cone adapted to be ejected into said combustion chamber from said fuel nozzles.

3. The combustor as defined in claim 2, wherein said regions define a wedge shaped area extending from a narrow upstream end to a wider downstream end.

4. The combustor as defined in claim 1, wherein said first set of cooling holes are defined within said region in a spacing density greater than that of said second set of cooling holes.

5. The combustor as defined in claim 1, wherein each hole of said first set of cooling holes defines a larger cross-sectional opening than that of said second set of cooling holes.

6. The combustor as defined in claim 3, wherein said narrow upstream end is proximate said dome portion.

7. The combustor as defined in claim 3, wherein said wedge shaped areas are substantially trapezoidal.

8. A gas turbine engine reverse-flow combustor comprising an annular liner enclosing a combustion chamber, the liner having an annular dome portion and two liner wall portions spaced apart such that the dome portion is circumscribed thereby and disposed therebetween, the dome portion having defined therein a plurality of openings each adapted to receive a fuel nozzle for directing fuel into the combustion chamber in a spray cone, the openings being positioned in the dome portion substantially equidistant between the two liner wall portions, at least one of the liner wall portions having means for directing cooling air into the combustion chamber, said means providing more cooling air in regions corresponding substantially in shape to said spray cone and located downstream of each opening in alignment therewith.

9. The combustor as defined in claim 8, wherein said means include a plurality of cooling holes, said plurality of holes including first cooling holes disposed within said regions and second cooling holes disposed outside said regions, wherein said first cooling holes provide a greater cooling air flow there through than similarly sized areas of said liner having said second cooling holes therein.

10. The combustor as defined in claim 9, wherein said first cooling holes within said regions are disposed in a spacing density greater than that of said second cooling holes.

11. The combustor as defined in claim 9, wherein each of said first cooling holes defines a larger cross-sectional opening than that of said second cooling holes.

12. The combustor as defined in claim 9, wherein said plurality of holes define an annular cooling band extending around said at least one of the liner walls portions immediately downstream from the dome portion of said liner, said annular cooling band having said regions circumferentially spaced throughout, and said second cooling holes being defined within said annular cooling band between each said regions.

13. An annular combustor for a gas turbine engine comprising:

combustor walls including an inner liner and an outer liner spaced apart to define at least a portion of a combustion chamber there between;

a plurality of fuel nozzles disposed in openings defined in an annular dome end of the combustor between said inner and outer liners for injecting a spray cone of fuel mixture into the combustion chamber; and a plurality of cooling apertures defined though at least one of said inner and outer liners for delivering pressurized cooling air surrounding said combustor into said combustion chamber, said plurality of cooling apertures defining an annular cooling band extending around said at least one of said inner and outer liners immediately downstream from said annular dome end of the combustor having said fuel nozzles, said cooling apertures in said annular cooling band being provided in one of two spacing densities, thereby providing circumferentially adjacent first and second regions of cooling apertures within the annular cooling band, a boundary between the first and second regions being defined by a change in spacing density of said cooling apertures, the cooling apertures being disposed in multiple rows and having a first spacing density in the first regions of said annular cooling band, each of the first regions being centered on one of said fuel nozzles and the boundary of the first regions in use substantially corresponding in shape to the spray cone of said fuel nozzles, said cooling apertures being disposed in multiple rows and having a second spacing density in the second regions of said annular cooling band, said annular cooling band having said first regions circumferentially spaced throughout and said second regions being all of a remaining portion of the band disposed between each of said first regions, and wherein said first spacing density is greater than said second spacing density.

14. The combustor as defined in claim 13, wherein said first regions substantially correspond in shape to the fuel spray cone injected into the combustion chamber by said fuel nozzles.

15. The combustor as defined in claim 14, wherein said first regions define a wedge shaped area extending from a narrow upstream end to a wider downstream end.

16. The combustor as defined in claim 15, wherein said wedge shaped areas are substantially trapezoidal.

17. The combustor as defined in claim 15, wherein said narrow upstream end is proximate said dome end of the combustor having said fuel nozzles.

18. The combustor of claim 13 wherein the first regions each provide a greater cooling air flow there through than a respective ones of said second region.

* * * * *